United States Patent
Xu (10) Patent No.: US 12,222,887 B2
(45) Date of Patent: Feb. 11, 2025

(54) BANDWIDTH ALLOCATION METHOD AND APPARATUS FOR PCIe EXTERNAL PLUG-IN CARD, AND DEVICE AND STORAGE MEDIUM

(71) Applicant: INSPUR SUZHOU INTELLIGENT TECHNOLOGY CO., LTD., Jiangsu (CN)

(72) Inventor: Tonghui Xu, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 127 days.

(21) Appl. No.: 18/026,339

(22) PCT Filed: Oct. 29, 2021

(86) PCT No.: PCT/CN2021/127325
§ 371 (c)(1),
(2) Date: Mar. 14, 2023

(87) PCT Pub. No.: WO2022/134855
PCT Pub. Date: Jun. 30, 2022

(65) Prior Publication Data
US 2023/0350831 A1    Nov. 2, 2023

(30) Foreign Application Priority Data
Dec. 26, 2020  (CN) .......................... 202011568747.9

(51) Int. Cl.
*G06F 13/14*    (2006.01)
*G06F 13/40*    (2006.01)
*G06F 13/42*    (2006.01)

(52) U.S. Cl.
CPC ........ *G06F 13/4072* (2013.01); *G06F 13/423* (2013.01); *G06F 13/4291* (2013.01); *G06F 2213/0026* (2013.01)

(58) Field of Classification Search
None
See application file for complete search history.

(56) References Cited

U.S. PATENT DOCUMENTS

2010/0082852 A1* 4/2010 White ................... G06F 13/122
710/33
2013/0275631 A1* 10/2013 Magro ................... G06F 13/16
710/28

(Continued)

FOREIGN PATENT DOCUMENTS

| CN | 106681878 A | 5/2017 |
|----|-------------|--------|
| CN | 110166301 A | 8/2019 |

(Continued)

OTHER PUBLICATIONS

PCT/CN2021/127325 international search report.
CN 202011568747.9 first office action.

*Primary Examiner* — Henry Tsai
*Assistant Examiner* — Dean Phan
(74) *Attorney, Agent, or Firm* — IPro, PLLC (57) ABSTRACT

Disclosed is bandwidth allocation method for a PCIe external plug-in card. The method comprises: configuring a south bridge chip to successively connect to a connector, an adapter card and a PCIe external plug-in card by means of an I2C bus, wherein the PCIe external plug-in card stores preset configuration information; in response to a system being powered on, the south bridge chip acquiring, by means of the I2C bus, the preset configuration information stored in the PCIe external plug-in card; and the south bridge chip determining a target bandwidth according to the preset configuration information, and allocating a bandwidth to the (Continued)

PCIe external plug-in card on the basis of the target bandwidth.

20 Claims, 6 Drawing Sheets

(56) References Cited

U.S. PATENT DOCUMENTS

| | | | |
|---|---|---|---|
| 2014/0189189 A1 | 7/2014 | Liu et al. | |
| 2014/0281095 A1* | 9/2014 | Huang | G06F 13/128 |
| | | | 710/301 |
| 2015/0058517 A1* | 2/2015 | Jacobson | G06F 13/385 |
| | | | 710/316 |
| 2016/0378620 A1* | 12/2016 | Sim | G06F 11/1417 |
| | | | 714/6.13 |
| 2017/0192925 A1* | 7/2017 | Han | G06F 13/4027 |
| 2018/0165244 A1 | 6/2018 | Jimenez et al. | |
| 2018/0288171 A1* | 10/2018 | Fogelson | H04L 67/51 |
| 2021/0034140 A1* | 2/2021 | Rowley | G06F 13/4081 |
| 2021/0109582 A1* | 4/2021 | Muccini | G06F 1/3243 |

FOREIGN PATENT DOCUMENTS

| | | |
|---|---|---|
| CN | 110389916 A | 10/2019 |
| CN | 110825204 A | 2/2020 |
| CN | 112069107 A | 12/2020 |
| CN | 112737836 A | 4/2021 |
| IN | 111752871 A | 10/2020 |

* cited by examiner (Prior Art)
FIG. 1

BANDWIDTH ALLOCATION METHOD AND APPARATUS FOR PCIe EXTERNAL PLUG-IN CARD, AND DEVICE AND STORAGE MEDIUM

CROSS-REFERENCE TO RELATED APPLICATION

The present disclosure claims the priority of the Chinese patent application filed on Dec. 26, 2020, before the China National Intellectual Property Administration with the application number of 202011568747.9 and the title of "BANDWIDTH ALLOCATION METHOD AND APPARATUS FOR PCIE EXTERNAL PLUG-IN CARD, AND DEVICE AND STORAGE MEDIUM", which is incorporated herein in its entirety by reference.

FIELD

The disclosure relates to the technical field of server, in particular to a method for allocating a bandwidth for a PCIe external plug-in card, and an apparatus, a device and a storage medium thereof.

BACKGROUND

With rapid development of cloud computing, numbers of cores of Central Processing Units (CPU) have increased, and types of external plug-in cards that need to be supported have increased as well. According to a specification definition of Peripheral Component Interconnect Express (PCIe, a kind of specification of high-speed serial computer extended bus), a bandwidth of a standard PCIe card may be X1, X4, X8, or X16, and a high bandwidth may be downward compatible with a low bandwidth.

SUMMARY

The disclosure discloses a method for allocating a bandwidth for a PCIe external plug-in card, including:
configuring a PCH of a system to connect with a connector, an adapter card and a PCIe external plug-in card successively through an I2C bus;
in response to that the system is powered on, enabling the PCH to obtain a preset configuration information stored in the PCIe external plug-in card through the I2C bus; and
enabling the PCH to determine a target bandwidth according to the preset configuration information, and allocate a bandwidth for the PCIe external plug-in card based on the target bandwidth.

In an embodiment, the configuring the PCH to connect with the connector, the adapter card and the PCIe external plug-in card successively through the I2C bus, includes:
configuring the PCH to connect with a baseboard management controller through the I2C bus; and
configuring the baseboard management controller to connect with the connector, the adapter card and the PCIe external plug-in card successively through the I2C bus.

In an embodiment, the enabling the PCH to obtain the preset configuration information stored in the PCIe external plug-in card through the I2C bus, includes:
in response to that the system is powered on, sending, by the baseboard management controller, a first read request to the PCIe external plug-in card through the I2C bus;
in response to the first read request, returning, by the PCIe external plug-in card, the preset configuration information to the baseboard management controller through the I2C bus; and
receiving the preset configuration information and sending the preset configuration information to the PCH, by the baseboard management controller.

In an embodiment, the configuring the PCH to connect with the connector, the adapter card and the PCIe external plug-in card successively through the I2C bus, includes:
configuring two input ends of an arbitration chip to respectively connect with the PCH and the baseboard management controller through the I2C bus;
configuring an output end of the arbitration chip to connect with the connector, the adapter card and the PCIe external plug-in card successively through the I2C bus;
in response to that the system is powered on, selecting, by the arbitration chip, the PCH as inputting after strobing of the arbitration chip is powered on; and
in response to that the PCH completes allocating the bandwidth, selecting, by the arbitration chip, the baseboard management controller as the inputting.

In an embodiment, the enabling the PCH to obtain the preset configuration information stored in the PCIe external plug-in card through the I2C bus, includes:
in response to that the arbitration chip selects the PCH as the inputting after the strobing of the arbitration chip is powered on, sending, by the PCH, a second read request to the PCIe external plug-in card through the I2C bus; and
in response to the second read request, returning, by the PCIe external plug-in card, the preset configuration information to the PCH through the I2C bus.

In an embodiment, the enabling the PCH to determine the target bandwidth according to the preset configuration information, includes:
parsing the preset configuration information to obtain a first preset field representing the bandwidth; or
parsing the preset configuration information to obtain a second preset field representing a type of the PCIe external plug-in card, and matching the second preset field with a corresponding relationship between preset fields and bandwidths, to obtain the target bandwidth.

In an embodiment, the target bandwidth is any one of X16, X8+X8, or X4+X4+X4+X4.

The disclosure further discloses an apparatus for allocating a bandwidth for a PCIe external plug-in card, including:
an I2C bus configuration module, configured to configure a PCH of a system to connect with a connector, an adapter card and a PCIe external plug-in card successively through an I2C bus;
an acquisition module, configured to, in response to that the system is powered on, enable the PCH to obtain preset configuration information stored in the PCIe external plug-in card through the I2C bus; and
an allocation module, configured to, enable the PCH to determine a target bandwidth according to the preset configuration information, and allocate a bandwidth for the PCIe external plug-in card based on the target bandwidth.

The disclosure further discloses a computer device, including: a memory and one or more processors, wherein the memory stores computer-readable instructions, and in response to that the computer-readable instructions are executed by the one or more processors, the computer-readable instructions make the one or more processors perform steps of the method for allocating the bandwidth for the PCIe external plug-in card in any one of the above embodiments.

The disclosure further discloses a or a plurality of non-volatile computer-readable storage media, storing computer-readable instructions, wherein, in response to that the computer-readable instructions are executed by one or more processors, the computer-readable instructions make the one or more processors perform steps of the method for allocating the bandwidth for the PCIe external plug-in card in any one of the above embodiments.

BRIEF DESCRIPTION OF THE DRAWINGS

In order to more clearly illustrate technical solutions in the embodiments of the disclosure or in prior art, the following will briefly introduce drawings needed to be used in illustrating the embodiments or the prior art. Apparently, the drawings in the following description are only embodiments of the disclosure. For those ordinary skilled in the field, they may further obtain other drawings according to the provided drawings without paying creative labor.

DETAILED DESCRIPTION OF THE EMBODIMENTS

In order to make the technical solution and advantages of the disclosure more distinct, the following will further describe the embodiments of the disclosure in detail with reference to the embodiments and the accompanying drawings.

It should be noted that expressions using "first" and "second" in the embodiments of the present disclosure are intended to distinguish two different entities or different parameters with the same name, therefore, both "first" and "second" are only for the sake of convenience of expression, and should not be understood as limiting the embodiments of the present disclosure, which is no longer specified in the subsequent embodiments.

With development of cloud technology and rise of smart networks and smart chips, there are more types of bandwidths of PCIe external plug-in cards, for example, X8+X8, X4+X4+X4+X4, and so on. Generally, an external plug-in card converses through a adapter card (Riser card). How to make the same Riser card support different bandwidth allocations becomes particularly important. A PCIe signal comes from a CPU. A Platform Controller Hub (PCH) needs to obtain bandwidth requirements of different external plug-in cards. How to make the same Riser card to adapt different bandwidth allocation schemes becomes particularly important.

Figure 1:
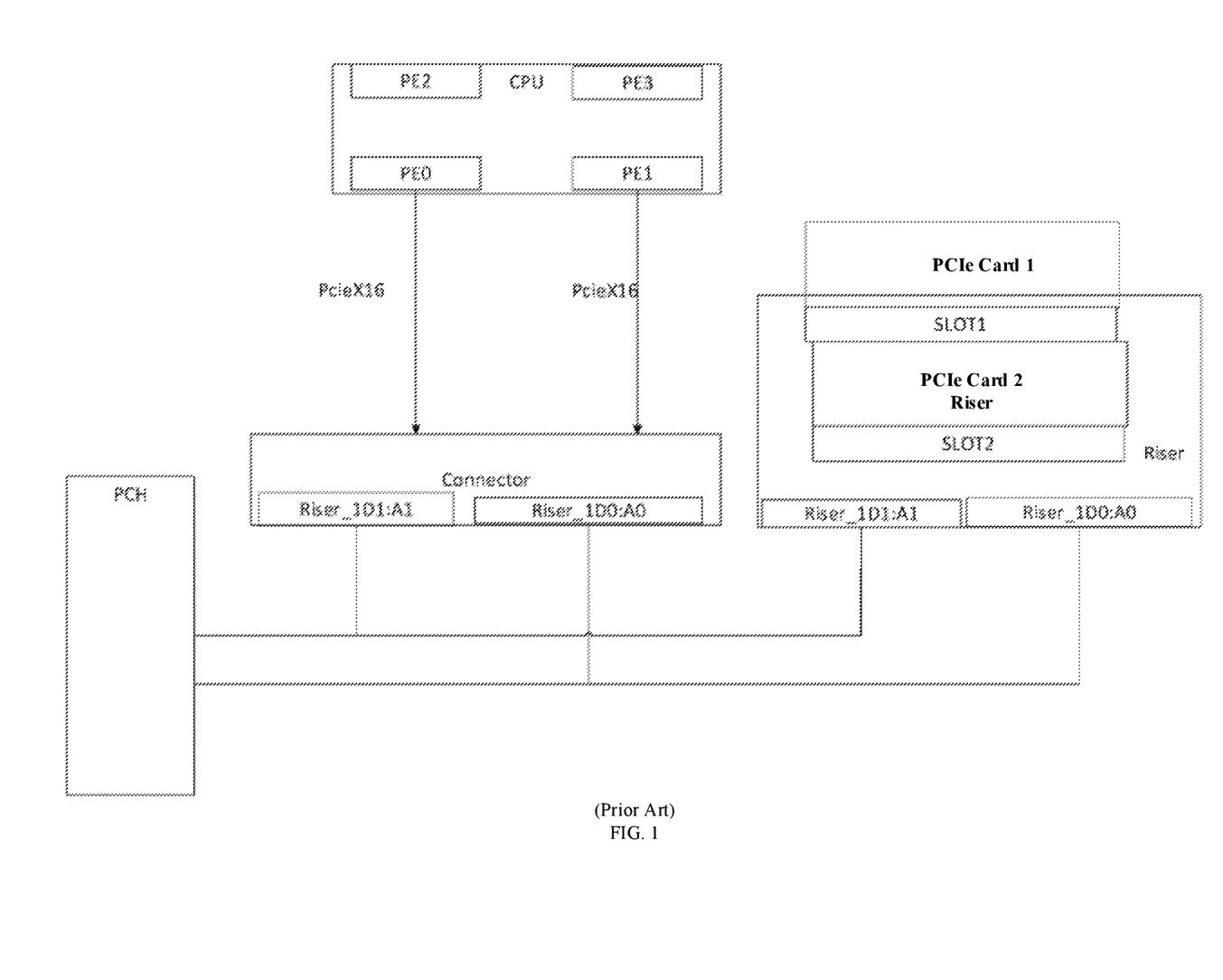
FIG. 1 is a schematic diagram of a manner for allocating a bandwidth for a PCIe external plug-in card.

FIG. 1 shows a manner for allocating a bandwidth of an existing PCIe external plug-in card, a principle of which is to use a PCH to identify a sideband signal A1 and a sideband signal A0 of a Riser card to allocate a bandwidth X16 to two slots, SLOT 1 and SLOT 2, of the Riser card respectively. Because both the SLOT 1 and SLOT 2 are standard PCIe slots, they may only be configured to be of a bandwidth of X16. If a system needs to support a new external plug-in card, a new Riser card needs to be developed, to be set with a different signal of Riser_1D1 and Riser_1D to be transmitted to the PCH, so that the PCH may make a different bandwidth allocation scheme to adapt the external plug-in card. It may be seen that in the manner for allocating the bandwidth of the existing PCIe external plug-in card, a distinguishing depends on General-purpose input/output (GPIO) hardware of a Riser adapter card, resulting in that one Riser card may only adapt one bandwidth allocation. If a user needs to use a self-developed external plug-in card with a non-standard PCIe bandwidth allocation, for example, a bandwidth allocation scheme is X8+X8, or X4+X4+X4+X4, the user needs to re-develop a plurality of Riser adapter cards, which is extremely inflexible, and development, operation and maintenance costs of which are high.

Figure 2:
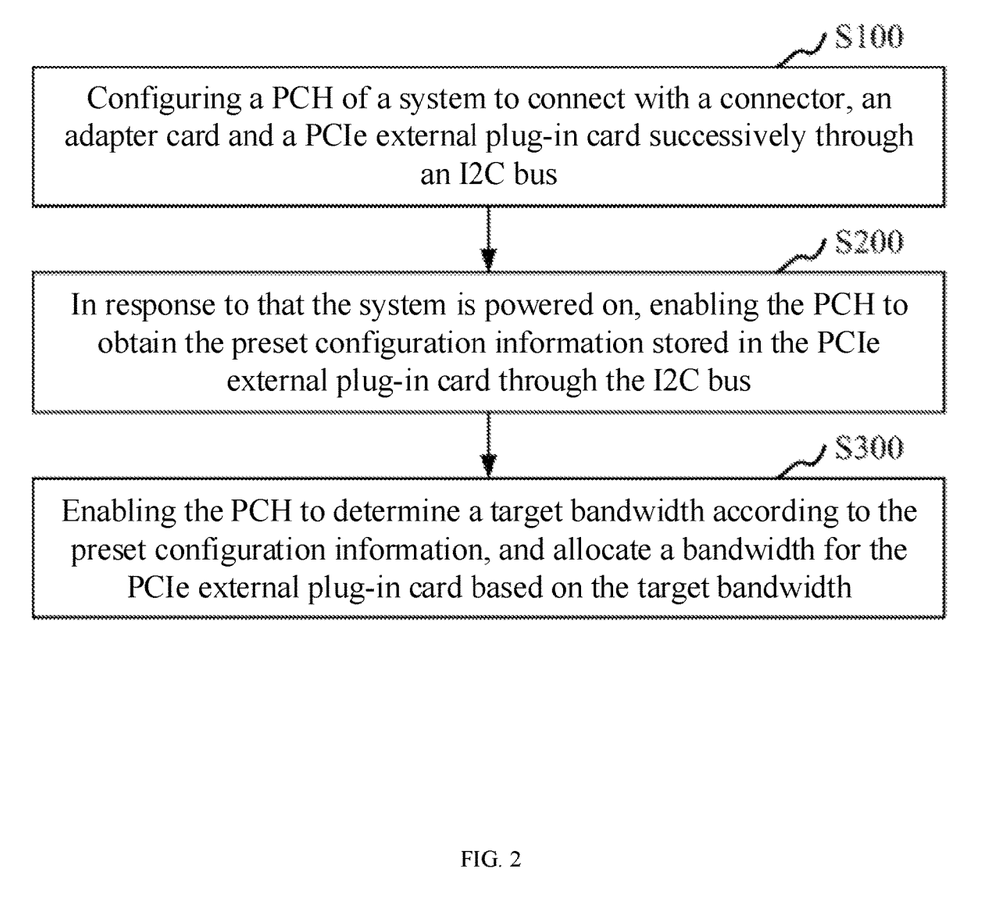
FIG. 2 is a flow chart of a method for allocating a bandwidth for a PCIe external plug-in card provided by an embodiment of the disclosure.

In some embodiments, please refer to that shown in FIG. 2, the disclosure provides a method for allocating a bandwidth for a PCIe external plug-in card, which includes the following steps S100-S300.

S100, configuring a PCH of a system to connect with a connector (any connection member that is able to switch or transfer data), an adapter card and a PCIe external plug-in card successively through an Inter-Integrated Circuit (I2C) bus, wherein preset configuration information is stored in the PCIe external plug-in card.

S200, in response to that the system is powered on, enabling the PCH to obtain the preset configuration information stored in the PCIe external plug-in card through the I2C bus. In a concrete implementation process, that the PCH allocates a bandwidth may be carried out after a PowerButton of the system is pressed down. In order to ensure a normal use of the external plug-in card, the PCH may immediately obtain the preset configuration information after the system is powered on.

S300, enabling the PCH to determine a target bandwidth according to the preset configuration information, and allocate a bandwidth for the PCIe external plug-in card based on the target bandwidth. For example, the target bandwidth may be any one of X16, X8+X8, or X4+X4+X4+X4.

The above method for allocating the bandwidth for the PCIe external plug-in card is to store the preset configuration information in the PCIe external plug-in card, connect the PCH, the connector, the adapter card and the PCIe external plug-in card successively by using the I2C bus, and obtain the preset configuration information through the I2C bus, and then enable the PCH to determine the target bandwidth according to the preset configuration information, and allocate the bandwidth for the PCIe external plug-in card based on the target bandwidth, which avoids using hardware pins of the adapter card to define the bandwidth, makes a bandwidth allocation of the PCIe external plug-in card more flexible, does not need to replace different adapter cards or manually set a sideband signal of the adapter card, and may effectively reduce development, operation and maintenance costs.

Figure 3:
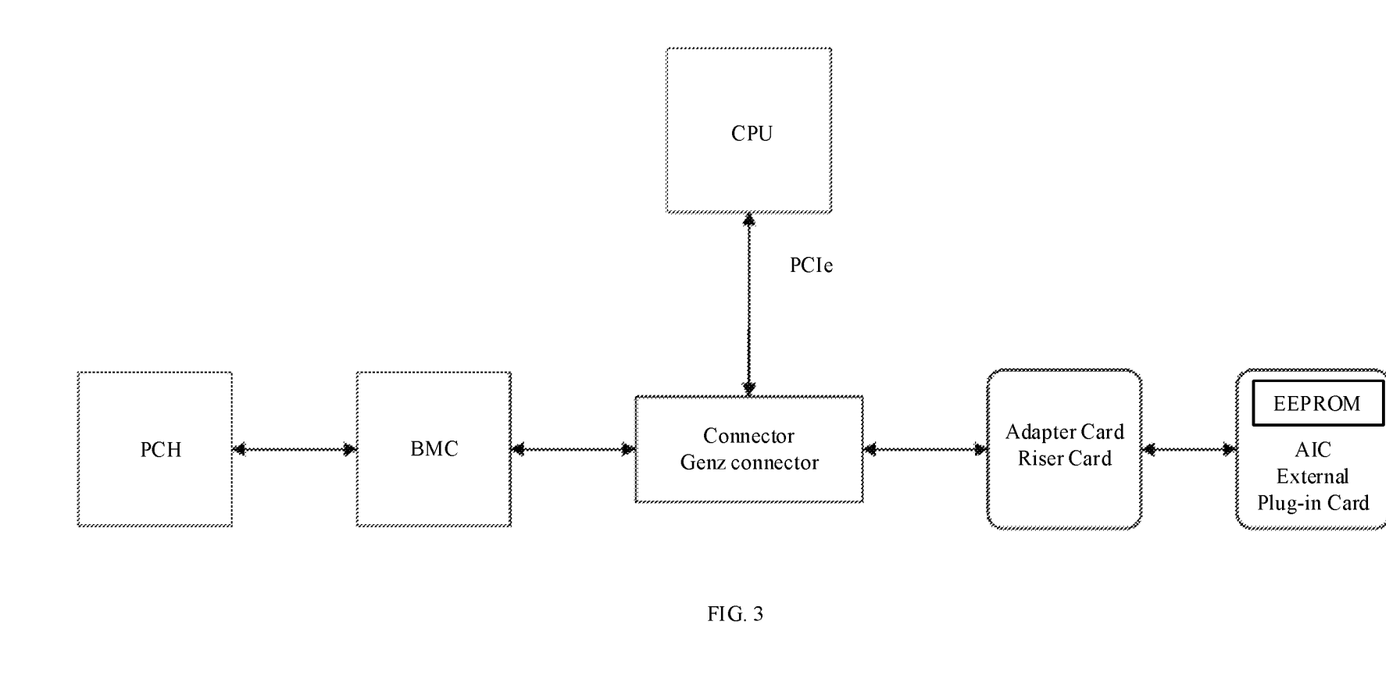
FIG. 3 is a schematic diagram of an I2C bus topology for allocating a bandwidth for a PCIe external plug-in card provided by an embodiment of the disclosure.

In some embodiments, please refer to that shown in FIG. 3, FIG. 3 shows a schematic diagram of an I2C bus topology for allocating a bandwidth for a PCIe external plug-in card, for example, any AIC (Add in Card), and when it is concretely implemented, it may adopt that the PCH directly reads information in the PCIe external plug-in card. Concretely, the step S100 includes:

S110A, configuring the PCH to connect with a baseboard management controller (BMC) through the I2C bus; and     S120A, configuring the baseboard management controller to connect with the connector, the adapter card and the PCIe external plug-in card successively through the I2C bus.

In some embodiments, the step 200 concretely includes the following sub-steps:

S210A, in response to that the system is powered on, sending, by the baseboard management controller, a first read request to the PCIe external plug-in card through the I2C bus;

S220A, in response to the first read request, returning, by the PCIe external plug-in card, the preset configuration information to the baseboard management controller through the I2C bus; and     S230A, receiving the preset configuration information and sending the preset configuration information to the PCH, by the baseboard management controller.

Figure 4:
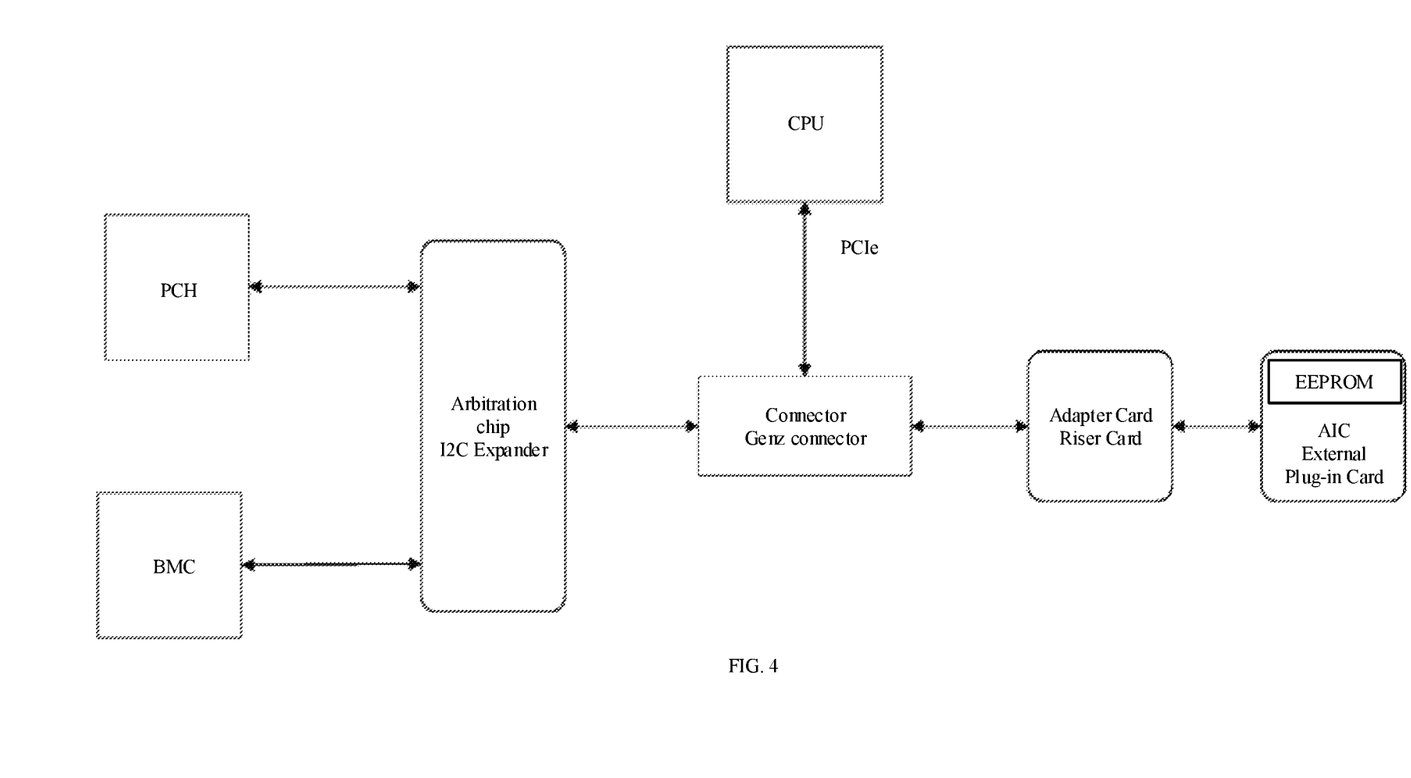
FIG. 4 is a schematic diagram of an I2C bus topology for allocating a bandwidth for a PCIe external plug-in card provided by another embodiment of the disclosure.

In some embodiments, please refer to that shown in FIG. 4, the information of the PCIe external plug-in card may be read by directly using the PCH, without transferring of the baseboard management controller. Concretely, the step S100 includes the following sub-steps S110B-S140B.

S110B, configuring two input ends of an arbitration chip to respectively connect with the PCH and the baseboard management controller through the I2C bus.

S120B, configuring an output end of the arbitration chip to connect with the connector, the adapter card and the PCIe external plug-in card successively through the I2C bus.

S130B, in response to that the system is powered on, selecting, by the arbitration chip, the PCH as inputting after strobing of the arbitration chip is powered on. Concretely, the bandwidth of the PCIe external plug-in card is allocated during a startup process after the PowerButton key of the system is pressed down, which is performed in an earlier PEI stage (i.e., a Pre-EFI Initialization Phase, which is a phase during a startup process of a unified extendable firmware system). Therefore, the PCH needs to obtain the preset configuration information of the PCIe external plug-in card before the PEI stage, thus the input end of the arbitration chip of I2C Expander (a kind of I2C chip that is able to expand one channel to more channels) is selected as the PCH by default. The PCH may directly read the preset configuration information of the external plug-in card when the PCH is in an S5 state (i.e., after the system is powered on).

S140B, in response to that the PCH completes allocating the bandwidth, selecting, by the arbitration chip, the baseboard management controller as the inputting. Since the baseboard management controller needs to supervise the PCIe external plug-in card after the system is powered on, it is necessary to transfer a management right to the baseboard management controller for performing subsequent operations, for example, temperature controlling, and so on.

In some embodiments, the step S200 concretely includes the following sub-steps:

S210B, in response to that the arbitration chip selects the PCH as the inputting after the strobing of the arbitration chip is powered on, sending, by the PCH, a second read request to the PCIe external plug-in card through the I2C bus; and     S220B, in response to the second read request, returning, by the PCIe external plug-in card, the preset configuration information to the PCH through the I2C bus.

In some embodiments, the step S300 concretely includes:

S310, parsing the preset configuration information to obtain a first preset field representing the bandwidth; or the step S300 includes:

S320, parsing the preset configuration information to obtain a second preset field representing a type of the PCIe external plug-in card; and     S330, matching the second preset field with a corresponding relationship between preset fields and bandwidths, to obtain the target bandwidth.

For example, in an implementation process, the information of the PCIe external plug-in card may be stored in an EEPROM (Electrically Erasable Programmable Read-Only Memory) of the PCIe external plug-in card according to a preset format. The information includes: the type, a unique identification PN (Part Number) number, an asset information, and so on. The EEPROM may directly store a required bandwidth, so that, when the PCH reads the EEPROM of the PCIe external plug-in card, the PCH may directly parse the target bandwidth or the required bandwidth for matching the type of external plug-in card. Therefore, it does not need to perform sperate modification on GPIO hardware of the adapter card, which saves development cost for developing a plurality of adapter cards, and operation and maintenance cost thereof, and enables the system to support more and flexible plug-in cards.

Figure 5:
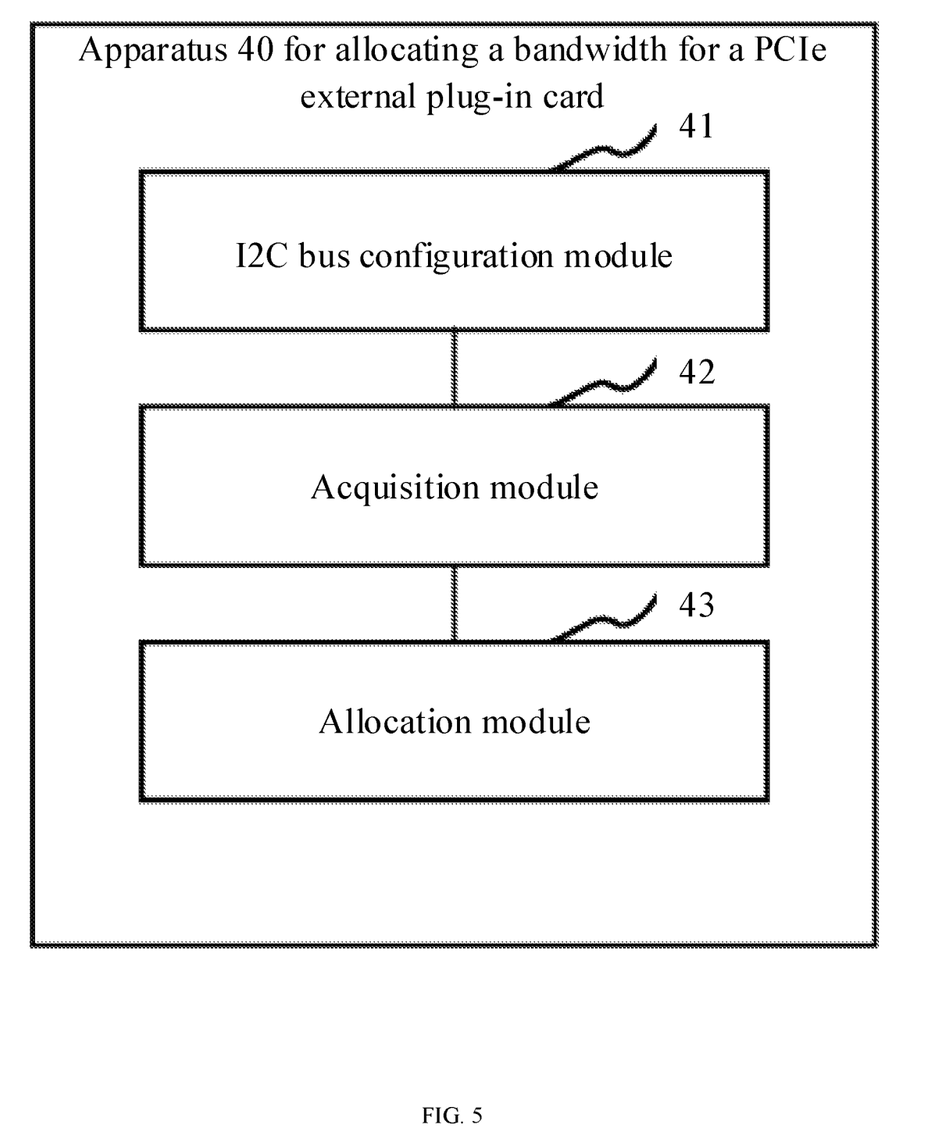
FIG. 5 is a schematic diagram of a structure of an apparatus for allocating a bandwidth for a PCIe external plug-in card provided by an embodiment of the disclosure.

In some embodiments, please refer to FIG. 5, the disclosure further provides an apparatus 40 for allocating a bandwidth for a PCIe external plug-in card, which includes:

an I2C bus configuration module 41, configured to configure a PCH of a system to connect with a connector, an adapter card and a PCIe external plug-in card successively through an I2C bus;

an acquisition module 42, configured to, in response to that the system is powered on, enable the PCH to obtain preset configuration information stored in the PCIe external plug-in card through the I2C bus; and     an allocation module 43, configured to, enable the PCH to determine a target bandwidth according to the preset configuration information, and allocate a bandwidth for the PCIe external plug-in card based on the target bandwidth.

It should be noted that the concrete definition of the apparatus for allocating the bandwidth for the PCIe external plug-in card may be referred to the above definition of the method for allocating the bandwidth for the PCIe external plug-in card, which is not repeated herein. The respective modules in the above apparatus for allocating the bandwidth for the PCIe external plug-in card may be realized wholly or partially by software, hardware and a combination thereof. The above respective modules may be embedded in or separate of a processor in a computer device in a form of hardware, or may be stored in a memory in the computer device in a form of software, so as to facilitate the processor to call and execute operations corresponding of the above respective modules.

Figure 6:
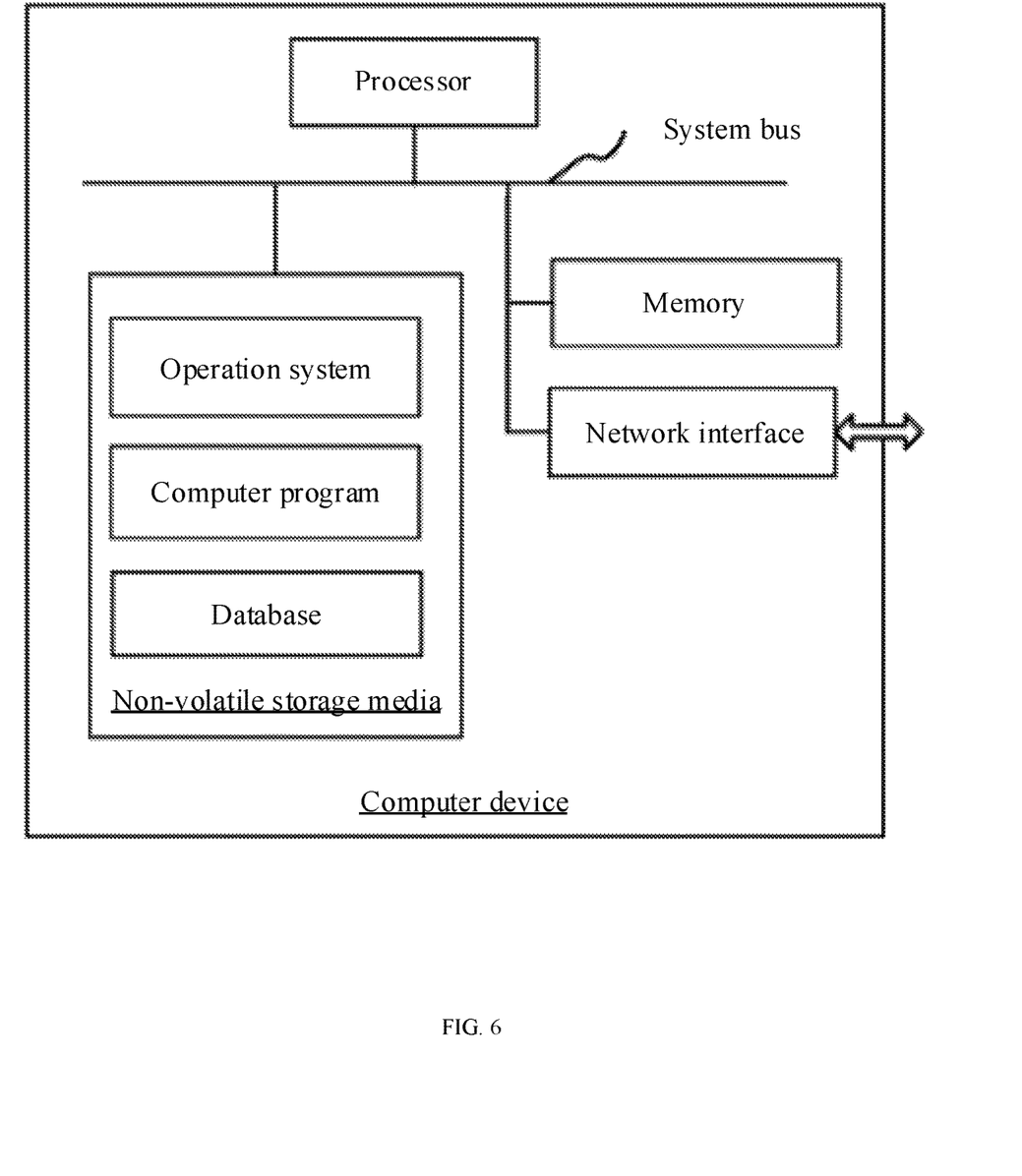
FIG. 6 is a diagram of an internal structure of a computer device in an embodiment of the disclosure.

The present disclosure further discloses a computer device, and the computer device may be a server, a diagram of an internal structure of which may be referred to that shown in FIG. 6. The computer device includes a processor, a storage device, a network interface and a database connected through a system bus. Among them, the processor of the computer device is used for providing computing and control capabilities. The storage device of the computer device includes a non-volatile storage medium and a memory. The non-volatile storage medium stores an operating system, computer-readable instructions and a database. The memory provides an environment for running the operating system and the computer-readable instructions in the non-volatile storage medium. The database of the computer device is used for storing data. The network interface of the computer device is used for communicating with an external terminal through a network connection. Concretely, when the computer-readable instructions are executed by one or more processors, they make the one or more processors perform the steps of the method for allocating the bandwidth for the PCIe external plug-in card in any one of the above embodiments.

The present disclosure discloses a computer-readable storage medium, on which computer-readable instructions are stored. When the computer-readable instructions are executed by one or more processors, they make the one or more processors perform the steps of the method for allocating the bandwidth for the PCIe external plug-in card in any one of the above embodiments.

Those ordinary skilled in the art may understand that realizing every or a part of process in the methods of the above embodiments may be completed by the computer-readable instructions instructing relevant hardware. The computer-readable instructions may be stored in a non-volatile computer-readable storage medium. When the computer-readable instructions are executed, they may realize the processes including the methods of the above respective embodiments. Among them, any reference to a storage device, a storage, a database or other media used in the respective embodiments provided by the present application may include a non-volatile memory and/or a volatile memory. The non-volatile memory may include read-only memory (ROM), programmable ROM (PROM), electrically programmable ROM (EPROM), electrically erasable programmable ROM (EEPROM) or flash memory. The volatile memory may include random access memory (RAM) or external cache memory. As an illustration but not a limitation, the RAM is available in many forms, for example, static RAM (SRAM), dynamic RAM (DRAM), synchronous DRAM (SDRAM), dual data rate SDRAM (DDRSDRAM), enhanced SDRAM (ESDRAM), synchronous link (Synchlink) DRAM (SLDRAM), Rambus direct RAM (RDRAM), direct memory bus dynamic RAM (DRDRAM), memory bus dynamic RAM (RDRAM), and so on.

Respective technical features of the above embodiments may be combined arbitrarily. In order to make the description concise, the respective technical features of the above embodiments are not described in every possible combination thereof. However, as long as the combination of these technical features is not contradictory, it should be considered as the scope of the specification.

The above embodiments only express several embodiments of the present application, the description of which is more concrete and detailed, but it shall not be understood as a limitation on the scope of the disclosure thereby. It should be pointed out that, for those ordinary skilled in the art, without departing from the concept of the application, they may further make a number of changes and improvements, which are within the scope of protection of the application. Therefore, the scope of protection of the application shall be subject to the appended claims.

The invention claimed is:

1. A method for allocating a bandwidth for a Peripheral Component Interconnect Express (PCIe) external plug-in card, comprising:
configuring a Platform Controller Hub (PCH) of a system to connect with a connector, an adapter card and a PCIe external plug-in card successively through an Inter-Integrated Circuit (I2C) bus;
in response to that the system is powered on, enabling the PCH to obtain a preset configuration information stored in the PCIe external plug-in card through the I2C bus; and
enabling the PCH to determine a target bandwidth according to the preset configuration information, and allocate a bandwidth for the PCIe external plug-in card based on the target bandwidth,
wherein the configuring the PCH to connect with the connector, the adapter card and the PCIe external plug-in card successively through the I2C bus, comprises:
configuring the PCH to connect with a baseboard management controller through the I2C bus; and
configuring the baseboard management controller to connect with the connector, the adapter card and the PCIe external plug-in card successively through the I2C bus, and
wherein the enabling the PCH to obtain the preset configuration information stored in the PCIe external plug-in card through the I2C bus, comprises:
in response to that the system is powered on, sending, by the baseboard management controller, a first read request to the PCIe external plug-in card through the I2C bus;
in response to the first read request, returning, by the PCIe external plug-in card, the preset configuration information to the baseboard management controller through the I2C bus; and
receiving the preset configuration information and sending the preset configuration information to the PCH, by the baseboard management controller.

2. The method according to claim 1, wherein the enabling the PCH to determine the target bandwidth according to the preset configuration information, comprises:
parsing the preset configuration information to obtain a first preset field representing the bandwidth; or
parsing the preset configuration information to obtain a second preset field representing a type of the PCIe external plug-in card, and matching the second preset field with a corresponding relationship between preset fields and bandwidths, to obtain the target bandwidth.

3. The method according to claim 2, wherein the target bandwidth is any one of X16, X8+X8, or X4+X4+X4+X4.

4. The method according to claim 1, wherein in response to that the system is powered on, the enabling the PCH to obtain the preset configuration information stored in the PCIe external plug-in card through the I2C bus, comprises:
in response to that a PowerButton of the system is pressed down, enabling the PCH to obtain the preset configuration information.

5. The method according to claim 1, wherein the preset configuration information is stored in an Electrically Erasable Programmable Read-Only Memory (EEPROM) of the PCIe external plug-in card.

6. The method according to claim 1, wherein the preset configuration information comprises any one of a type, a unique identification PN number, and an asset information, of the PCIe external plug-in card.

7. A method for allocating a bandwidth for a Peripheral Component Interconnect Express (PCIe) external plug-in card, comprising:
configuring a Platform Controller Hub (PCH) of a system to connect with a connector, an adapter card and a PCIe external plug-in card successively through an Inter-Integrated Circuit (I2C) bus;
in response to that the system is powered on, enabling the PCH to obtain a preset configuration information stored in the PCIe external plug-in card through the I2C bus; and
enabling the PCH to determine a target bandwidth according to the preset configuration information, and allocate a bandwidth for the PCIe external plug-in card based on the target bandwidth,
wherein the configuring the PCH to connect with the connector, the adapter card and the PCIe external plug-in card successively through the I2C bus, comprises:
configuring two input ends of an arbitration chip to respectively connect with the PCH and the baseboard management controller through the I2C bus;
configuring an output end of the arbitration chip to connect with the connector, the adapter card and the PCIe external plug-in card successively through the I2C bus;
in response to that the system is powered on, selecting, by the arbitration chip, the PCH as inputting after strobing of the arbitration chip is powered on; and
in response to that the PCH completes allocating the bandwidth, selecting, by the arbitration chip, the baseboard management controller as the inputting, and
wherein the enabling the PCH to obtain the preset configuration information stored in the PCIe external plug-in card through the I2C bus, comprises:
in response to that the arbitration chip selects the PCH as the inputting after the strobing of the arbitration chip is powered on, sending, by the PCH, a second read request to the PCIe external plug-in card through the I2C bus; and
in response to the second read request, returning, by the PCIe external plug-in card, the preset configuration information to the PCH through the I2C bus.

8. The method according to claim 7, wherein in response to that the system is powered on, the selecting, by the arbitration chip, the PCH as inputting after strobing of the arbitration chip is powered on, comprises:
in response to that a PowerButton of the system is pressed down, selecting, by the arbitration chip, the PCH as inputting after strobing of the arbitration chip is powered on.

9. The method according to claim 7, wherein in response to that the system is powered on, the selecting, by the arbitration chip, the PCH as inputting after strobing of the arbitration chip is powered on, is performed in a phase during a startup process of a unified extendable firmware system.

10. The method according to claim 8, wherein in response to that the system is powered on, the enabling the PCH to obtain the preset configuration information stored in the PCIe external plug-in card through the I2C bus, comprises:
in response to that the PowerButton of the system is pressed down, enabling the PCH to obtain the preset configuration information through the arbitration chip.

11. The method according to claim 9, wherein in response to that the system is powered on, the enabling the PCH to obtain the preset configuration information stored in the PCIe external plug-in card through the I2C bus, comprises:
in the phase during a startup process of a unified extendable firmware system, enabling the PCH to obtain the preset configuration information through the arbitration chip.

12. The method according to claim 7, wherein the enabling the PCH to determine the target bandwidth according to the preset configuration information, comprises:
parsing the preset configuration information to obtain a first preset field representing the bandwidth; or
parsing the preset configuration information to obtain a second preset field representing a type of the PCIe external plug-in card, and matching the second preset field with a corresponding relationship between preset fields and bandwidths, to obtain the target bandwidth.

13. The method according to claim 12, wherein the target bandwidth is any one of X16, X8+X8, or X4+X4+X4+X4.

14. The method according to claim 7, wherein the preset configuration information is stored in an Electrically Erasable Programmable Read-Only Memory (EEPROM) of the PCIe external plug-in card.

15. The method according to claim 7, wherein the preset configuration information comprises any one of a type, a unique identification PN number, and an asset information, of the PCIe external plug-in card.

16. A computer device for allocating a bandwidth for a PCIe external plug-in card, comprising: a memory and one or more processors, wherein the memory stores computer-readable instructions, and in response to that the computer-readable instructions are executed by the one or more processors, the computer-readable instructions make the one or more processors to
configure a PCH of a system to connect with a connector, an adapter card and a PCIe external plug-in card successively through an I2C bus;
in response to that the system is powered on, enable the PCH to obtain preset configuration information stored in the PCIe external plug-in card through the I2C bus; and
enable the PCH to determine a target bandwidth according to the preset configuration information, and allocate a bandwidth for the PCIe external plug-in card based on the target bandwidth,
wherein the configuring the PCH to connect with the connector, the adapter card and the PCIe external plug-in card successively through the I2C bus, comprises:
configuring the PCH to connect with a baseboard management controller through the I2C bus; and
configuring the baseboard management controller to connect with the connector, the adapter card and the PCIe external plug-in card successively through the I2C bus, and
wherein the enabling the PCH to obtain the preset configuration information stored in the PCIe external plug-in card through the I2C bus, comprises:
in response to that the system is powered on, sending, by the baseboard management controller, a first read request to the PCIe external plug-in card through the I2C bus;
in response to the first read request, returning, by the PCIe external plug-in card, the preset configuration information to the baseboard management controller through the I2C bus; and receiving the preset configuration information and sending the preset configuration information to the PCH, by the baseboard management controller.

17. The computer device according to claim 16, wherein the enabling the PCH to determine the target bandwidth according to the preset configuration information, comprises:
   parsing the preset configuration information to obtain a first preset field representing the bandwidth; or
   parsing the preset configuration information to obtain a second preset field representing a type of the PCIe external plug-in card, and matching the second preset field with a corresponding relationship between preset fields and bandwidths, to obtain the target bandwidth.

18. The computer device according to claim 17, wherein the target bandwidth is any one of X16, X8+X8, or X4+X4+X4+X4.

19. The computer device according to claim 16, wherein in response to that the system is powered on, the enabling the PCH to obtain the preset configuration information stored in the PCIe external plug-in card through the I2C bus, comprises:
   in response to that a PowerButton of the system is pressed down, enabling the PCH to obtain the preset configuration information.

20. The computer device according to claim 16, wherein the preset configuration information is stored in an Electrically Erasable Programmable Read-Only Memory (EEPROM) of the PCIe external plug-in card.

\* \* \* \* \*